United States Patent
Granati et al.

(10) Patent No.: US 6,352,574 B1
(45) Date of Patent: *Mar. 5, 2002

(54) PROCESS FOR DIRECT PRODUCTION OF CAST IRON FROM FINE IRON ORE AND FINE COAL

(75) Inventors: Paolo Granati, Rome; Antonello Di Donato, Citta' di Sant'Angelo; Giuseppe Federico, Rome, all of (IT)

(73) Assignee: Centro Sviluppo Materiali S.p.A., Rome (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/381,449
(22) PCT Filed: Mar. 25, 1998
(86) PCT No.: PCT/EP98/01738
§ 371 Date: Dec. 20, 1999
§ 102(e) Date: Dec. 20, 1999
(87) PCT Pub. No.: WO98/42878
PCT Pub. Date: Oct. 1, 1998

(30) Foreign Application Priority Data

Mar. 25, 1997 (IT) ...................................... RM97A0166

(51) Int. Cl.⁷ .............................................. C21B 11/00
(52) U.S. Cl. .............................. 75/453; 75/501; 75/502
(58) Field of Search ........................... 75/453, 501, 502

(56) References Cited

U.S. PATENT DOCUMENTS

| 3,607,224 A | 9/1971 | Blaskowski |
| 5,662,860 A | * 9/1997 | Klassen et al. ............... 75/453 |
| 6,146,440 A | * 11/2000 | De Cesare et al. ........... 75/453 |

FOREIGN PATENT DOCUMENTS

| EP | 0690136 | 1/1996 |
| EP | 0726326 | 8/1996 |
| WO | 9804751 | 2/1998 |

* cited by examiner

*Primary Examiner*—Melvyn Andrews
(74) *Attorney, Agent, or Firm*—Hedman & Costigan, P.C.

(57) ABSTRACT

A process is described for direct production of cast iron starting from iron bearing ore in an apparatus having two communicating chambers in which to carry out the process, comprising the following operations: pre-reduction and pre-heating to founding point of the iron bearing ore in a first substantially cylindrical chamber; final reduction, carburization and founding of the resulting iron in a second chamber arranged below said first chamber, in which coal and oxygen, injected into said second chamber, provide the reducing gas both in said second and in said first chamber, characterized by the fact that: said iron bearing ore and oxygen are introduced into said first chamber through the side walls thereof, simultaneously but separately, the oxygen being introduced at a speed lower or equal to the speed of introduction of said iron bearing ore; and said oxygen, coal and flux are introduced into said second chamber simultaneously but separately through the side walls thereof and in a manner inclined downwards and towards the center of said second chamber.

15 Claims, 2 Drawing Sheets

PROCESS FOR DIRECT PRODUCTION OF CAST IRON FROM FINE IRON ORE AND FINE COAL

TECHNICAL FIELD

The invention relates to a process and to an apparatus for direct production of cast iron from iron bearing ore (hereinafter referred to as "iron ore") having grains of different sizes and from fine coal.

Other processes for producing cast iron from coke and iron ore after pre-treatment processes like sintering or pelletizing are well-known and experimented and are presently the most common industrial way of producing cast iron. Processes for producing cast iron directly from iron and coal are presently under study.

1. Background Art

In the U.S. Pat. No. 3,607,224 a process is described where the whole conversion from iron ore into molten cast iron is carried out in one reactor, by adding some reagents in tangential direction into the reactor's top chamber.

In Malgarini et al. "First results from cleansmelt iron-making pilot plant"—Iron and Steel Engineer Vol. 74, N°1, P.30–31, Jan. 1997 a smelting reduction process is described wherein a reactor including a zone for prereduction and preheating and a zone for final reduction and carburization of liquid metal is described.

EP-690 136 describes a two-stages process for production of iron from iron compounds in a two chamber apparatus.

EP-726 326 describes a two-stages process for the production of pig iron wherein iron ore is directly reduced in a pre-reduction stage followed by a final reduction stage.

2. Disclosure of the Invention

The present invention relates to a process and to an apparatus for the production of molten cast iron in one single reactor from iron ore, fine coal, oxygen and fluxes.

More particularly, the present invention refers to a process for producing cast iron directly from fine iron ore and fine coal in an apparatus comprising one reaction chamber (reactor) only that includes two areas in open communication, one top area and one bottom area, where the process is carried out, this process being characterized by comprising the operations of:

feeding fine iron ore together and simultaneously with oxygen or preferably with a mixture of oxygen and air into the top area of the reactor through its side walls;

feeding fine coal, oxygen, fluxes and a carrier gas into the bottom area of the reactor through its side walls and a stirring gas from its bottom.

The invention provides carrying out the process in one reaction chamber (reactor) where two process stages take place, in two separated areas (hereinafter also referred to as "the dresser" and "the converter" for the top area and the bottom area respectively).

The two process stages are as follows:

in the dresser: iron ore is fed through a plurality of nozzles and carried by a stream of oxygen or preferably by a mixture of oxygen and air. It comes in contact with a hot and reducing gas generated in the bottom area of the reactor (converter), under such conditions that a partial combustion of the gas coming from the converter takes place, which cause a pre-heating and pre-reduction of the iron ore.

The pre-heated and pre-reduced iron ore is fed into the converter. The converter's performances depend on the chemical and thermal performances that are obtained in the dresser, and in particular on the pre-reduction degree and on the pre-heating temperature of the pre-reduced iron ore.

in the converter: the pre-reduced iron ore is completely reduced and molten cast iron is generated. A fuel, e.g. fine coal, and a supporter of combustion, e.g. oxygen, together with fluxes, a carrier gas and a stirring gas are introduced into the converter, where the hot reducing gas, which is fed into the dresser, is produced together with cast iron.

The dresser is connected to a discharge conduit for discharge of process gas. The process gas leaving the discharge conduit is cooled down by water jets and then crosses a Venturi pipe scrubber, where the particulate that may have formed in the gas is made to settle. Finally the gas is released into the utility network.

The process described can produce cast iron by operating the dresser in such a way so to pre-reduce iron ore at least into $Fe_3O_4$, while it is pre-heated to temperatures not lower than 800° C.

It is known that the main component of iron ore is hematite ($Fe_2O_3$) which can be reduced to $Fe_3O_4$ at temperatures that are not very high and in environment of relatively low reducing potential ($CO/(CO+CO_2)>0.1$ and $H_2/(H_2O+H_2)>0.1$).

As a consequence, pre-reducing iron ore to $Fe_3O_4$ is a feasible target and the finer is iron-ore grain, the quicker the kinetics of the reaction. With a gas temperature around 1600° C. or higher and iron-ore grain of a few millimeters, pre-heating iron ore to approx. 800° C. can take a remarkably short time of around one second of interaction between gas and iron ores.

Preferably the iron ore has a grain size smaller than 8 mm, and has a content of iron at least in part lower than 50%. The velocity of iron ore and oxygen introduction in the reactor top chamber is generally lower than 40 m/s.

The energy required by the chemical reactions and physical transformations taking place in the converter is mainly provided by the post-combustion of the reducing gas with oxygen (the oxygen blown into the converter is hereinafter referred to as "primary" or "secondary" according to whether it is injected to a lower or higher level in the converter, while the oxygen blown in the dresser can be referred to as "tertiary"). The reducing gas is generated from coal gasification when coal interacts either with (primary) oxygen blown together with coal, or with oxygen associated with the pre-reduced iron ore. The gasification reaction requires an adequate temperature in the system in order to be activated. Coal and (primary) oxygen are injected into a molten slag bath, that is composed of mineral gangue and ashes from coal and fluxes and which floats on the molten cast iron bath throughout the bath formation.

The grain size of fine coal and fine fluxes is preferably smaller than 3 mm. In the converter, iron oxides are reduced into metallic iron when they react with the coal scattered in the slag and with carbon monoxide that generates from coal gasification with primary oxygen: at the same time, iron is carburized resulting in molten cast iron. The chemical and thermal energy required by these reactions is provided by oxygen blown in the slag and by coal injected either as fine coal or added partly as fine coal and partly as sized coal that falls down under its own weight.

Simultaneous injection of coal and oxygen under the liquid slag surface by means of co-axial lances, the coal being carried by an inert gas, creates the appropriate temperature conditions and intimate mixing of coal and oxygen for a rapid coal gasification thus allowing to utilize any kind of coal, from low-volatile to high volatile.

Primary oxygen injection is adjusted so as to keep residual non-gasified coal scattered in the slag bath. It contributes to the final reduction of iron ore into metallic iron and to its carburization into cast iron.

Also secondary oxygen is injected under the slag surface so that heat from post-combustion develops inside the slag.

Heat transfer from slag to cast iron and uniformity of temperature and chemical composition within the slag and the metallic phase are assured efficiently by the convective motions induced by injecting coal and primary and secondary oxygen and by blowing the inert gas from the reactor's bottom.

Coal and primary oxygen lances are also used to inject basic fluxes (mainly calcium oxide) together with coal and simultaneously to primary oxygen. Preferably the ratio coal to flux ranges from 3 to 15.

Under these conditions, coal gasification occurs in the presence of a high local concentration of calcium oxide that permits on the one side to improve fixing in the slag—in the form of stable compounds—of sulphur from coal gasification, and on the other side to quickly neutralize silica from the coal ashes.

The process as above described provides for a number of benefits:

the tendency of sulphur to solubilize into cast iron is reduced, thus improving the quality of cast iron;

the quantity of sulphur in the exhaust gas is strongly decreased, resulting in advantages to the environment;

silica from coal ashes is quickly fixed into calcium silicates. This avoids that slag is locally enriched with silica thus decreasing the chemical attack of the refractory material around the injection lances;

the tendency of slag to foam is controlled. It is reminded that slag enriched with free silica tends to foam and that addition of fluxes contributes to generate a slag where silica is neutralized by basic oxides (e.g. CaO and MgO).

While slag foaming promotes heat exchange between the hot gas (gaseous phase of foam) and slag (liquid phase of foam) and also increases heat exchange with metal—thus stating the importance of foamy slag for the process—on the other side an excessive foaming can make the process unstable due to rapid raising of the slag height in the reactor. The best compromise is reached by acting on the slag composition in such a manner to obtain a binary basicity index, IB2, defined as the ratio $[\%CaO]/[\%SiO_2]$ in the range of 1.1 to 1.3.

The above modalities of addition of reagents, i.e. blowing a stirring gas from the reactor's bottom and combined side-lance injection of coal, fluxes and primary oxygen from bottom lances and secondary oxygen from top lances below the slag surface, give rise to a high reaction velocity and to an efficient heat exchange between the various phases (molten slag, molten cast iron and process gas) in the converter.

In addition, this configuration guarantees high flexibility of the values of post-combustion which can be achieved.

As a consequence, the apparatus described by the present invention can guarantee a high operating flexibility and high specific productivity.

The stirring gas introduced in the reactors bottom has preferably a power lower than 2.5 kW per ton of molten bath.

The invention also provides an apparatus for direct production of cast iron from iron ore and sea coal characterized in that it encompasses a reaction chamber (reactor) having:

a top area of a substantially rotationally symmetrical shape;

means for supplying iron ore, oxygen or a mixture of oxygen and air to said top area;

a discharge conduit connected with the top area, possibly shaped as two truncated cones with the larger bases in common, in case separated by a substantially cylindrical connector, a bottom area arranged beneath the top area, of a substantially rotationally symmetrical shape connected to the top area through a connector possibly shaped as a truncated cone;

means for supplying oxygen to said bottom area;

means for supplying oxygen, fine coal, fine fluxes and a carrier gas to said bottom area;

means for supplying a stirring gas to the bottom area.

BRIEF DESCRIPTION OF THE DRAWINGS

Additional characteristics of the apparatus are evident in the enclosed drawings.

DESCRIPTION OF THE PREFERRED EMBODIMENTS

In the apparatus according to the invention the ratio of the total height and inner diameter of the top area ranges preferably from 1 to 8; the ratio of total height and inner diameter of the bottom area ranges preferably from 1 to 4; the ratio for the inner diameter of the top area and inner diameter of the bottom area ranges preferably from 0.4 to 1; the ratio of the height of the top area and the height of the bottom area is preferably at least 0.8.

Figure 1:
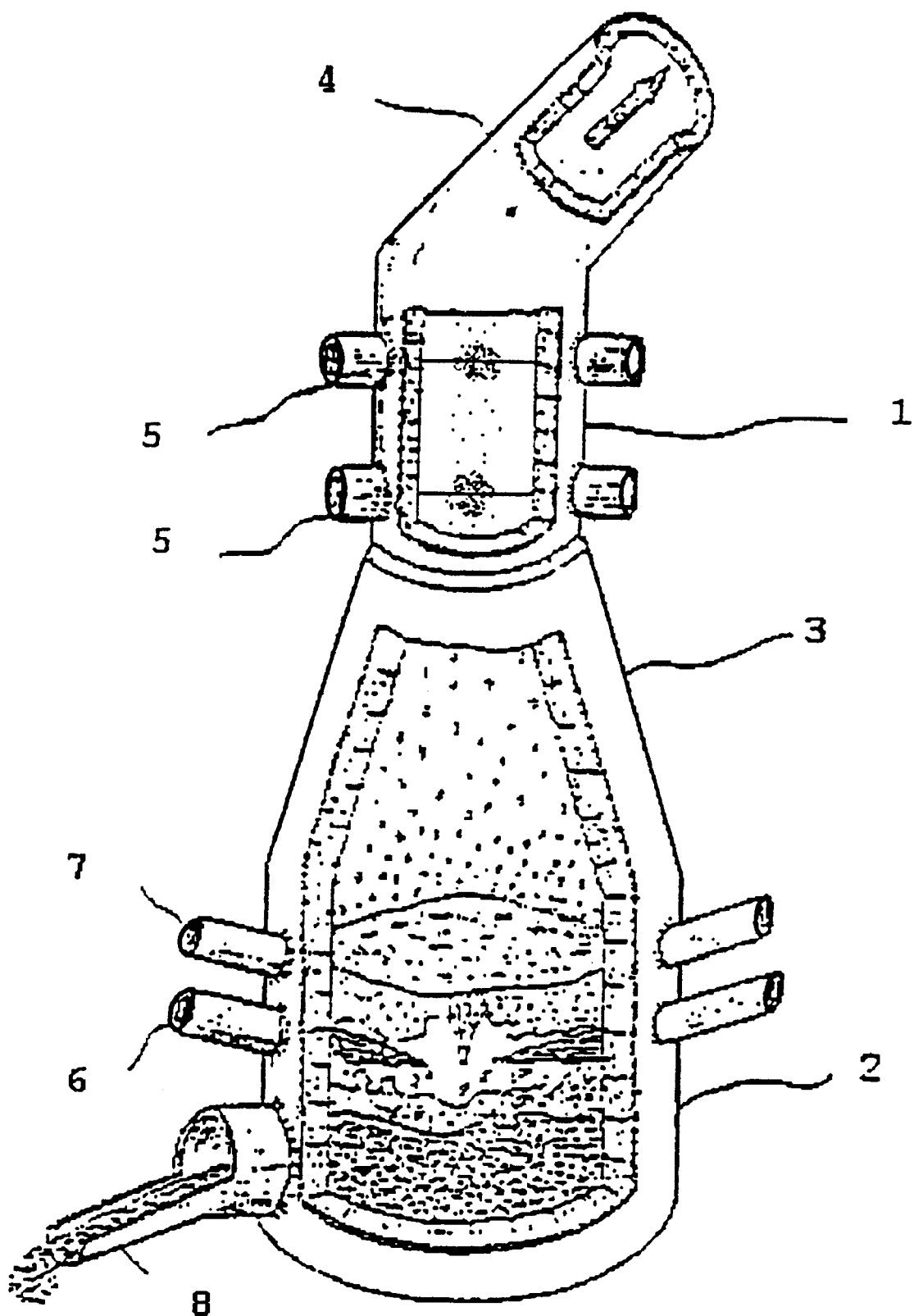
FIG. 1 is a schematic partial cross-sectioned perspective of a realisation of the apparatus according to the invention.

The apparatus in FIG. 1 is composed of one cylindrical body 1 referred to as the dresser and another cylindrical body 2 referred to as the converter, the latter being arranged beneath the former and connected to it through a connector 3 with a truncated-cone shape. The cylindrical body 1 communicates on top with a discharge conduit 4 (partially shown) that discharges the process gas to the outside.

The dresser 1 comprises at least one injection level for the simultaneous and joint introduction of iron ore and oxygen and more precisely of a mixture of oxygen and air.

As shown in FIG. 1, the materials are injected through a plurality of nozzles 5 (two of which are shown) that are uniformly spaced and arranged on two levels.

The ratio of height of the truncated-cone connector and height of the reactor's top area ranges form 0.2 to 0.5.

Beneath the truncated-cone connector 3 is the converter that receives the pre-reduced and pre-heated iron ore from the dresser for simultaneous complete reduction of the pre-reduced iron ore and carburization of iron into molten-cast iron.

Injection of fine coal, fine fluxes, carrier gas and (primary) oxygen in the slag takes place in the converter by means of tuyeres 6 that are either arranged horizontally or leaning downwards, whose number and position depend on the converter's size (only two of them are shown). The tuyeres are placed at a suitable height over the cast iron bath and in correspondence of the slag layer, so as to avoid re-oxidation of the cast iron bath.

In addition, (secondary) oxygen injection is performed by means of lances 7 either arranged horizontally or leaning downwards, at a higher level than the tuyeres 6, with the purpose of assuring post-combustion of gas.

In order to improve heat and mass exchanges, a stirring inert gas, e.g. nitrogen, is introduced from the converter bottom through porous plugs (not shown). This improvement is consequent to the generation of emulsions among coal, slag, molten metal and the gaseous phase which is composed substantially of CO, $H_2$, $H_2O$, $CO_2$ and $N_2$. The gaseous components CO, $H_2$, $H_2O$ and $CO_2$ are produced from coal gasification either by primary oxygen or by oxygen deriving from pre-reduction of iron oxide as well as from post-combustion with secondary oxygen. Nitrogen is introduced as a carrier gas and stirring gas.

Molten cast iron and slag are then tapped from the tape hole 8.

A more detailed description of the process according to the invention is provided hereinafter.

Iron ore is injected in the dresser together with oxygen or, more precisely, with a mixture of $O_2$ and air.

Also a gas from the underlying converter flows into the dresser. This gas is composed of CO, $CO_2$, $H_2$, $H_2O$ and an inert gas, e.g. nitrogen, and its temperature ranges from 1600 to 1800° C.

The oxygen blown in the dresser reacts with the gas from the converter. This combustion supplies energy that is necessary to support preheating and pre-reduction of iron ore.

The extent of pre-heating and pre-reduction is measured by means of two parameters: pre-reduction degree (PRD) and temperature of pre-reduced mineral.

Assuming FeOx as iron oxide in the pre-reduced mineral, PRD is defined as follows:

$$PRD=(1-x/1.5)\times100$$

where:

| x = 1.5 | i.e. $Fe_2O_3$ | PRD = 0% |
| x = 1.33 | i.e. $Fe_3O_4$ | PRD = 11% |
| x = 1 | i.e. FeO | PRD = 33% |

Pre-reduced and pre-heated iron ore, possibly in semi-molten state, falls down in the converter under its own weight.

It should be considered that one portion of iron ore may be carried outside the dresser along with the gas leaving the reactor and conveyed into the gas discharge conduit 4 (carry-over).

The carry-over fraction must be kept as low as possible (a few percentage) in order to avoid loosing the iron ore injected. The following measures are recommended to minimize carry-over.

Figure 2:
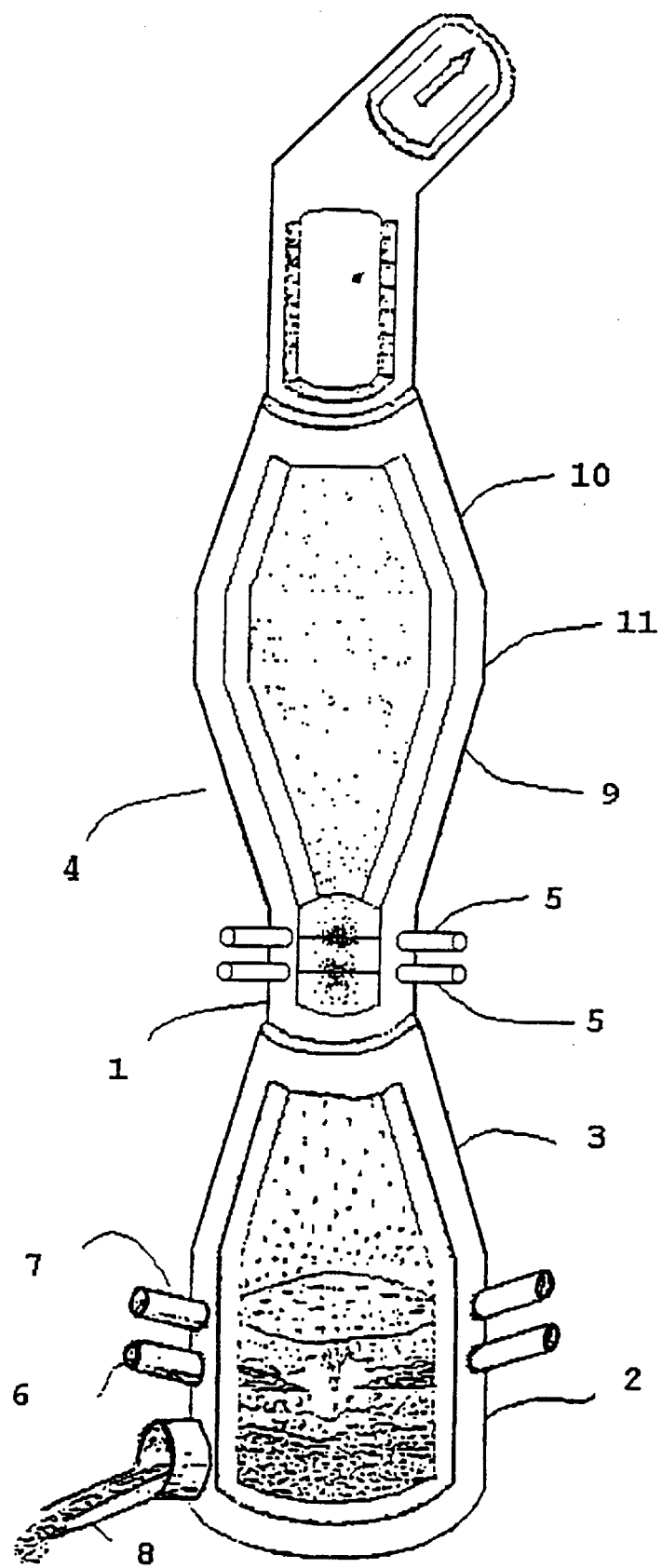
FIG. 2 is a schematic partial cross-sectioned perspective of a second realisation of the apparatus according to the invention.

- the dresser and the discharge conduit must have a suitable shape, as shown in FIG. 1 and 2;
- the reactor should preferably operate under pressure;
- the dresser should preferably be cooled in a differentiated manner along its height.

The inner pressure of the reactor ranges preferably from 1 to 4 bar in order to keep the average axial velocity of the gas in the reactor's top area below 5 m/s and to keep the carry-over below 5%.

The converter contains a bath of molten cast iron bath and a layer of molten slag that floats above the cast iron bath.

Final reduction of the pre-reduced ore occurs in the slag phase. Reduction is performed by fine coal which is injected directly in the slag and by sized coal, if any (direct reduction), and also thanks to CO that generates either from direct reduction of iron oxides with coal or from coal gasification by $O_2$ blown together with coal.

The reactions leading to final reduction of FeOx into Fe can be summarized as follows:

| | |
|---|---|
| FeOx + XC = Fe + XCO | (I) direct reduction |
| FeOx + XCO = Fe + $XCO_2$ | (II) indirect reduction |

At the same time as the above reaction occur, coal gasification is carried out by primary oxygen in front of the primary tuyeres 6 (FIG. 1).

This reaction is summarized as follows:

$$2C+3/2O_2=CO+CO_2 \qquad \text{(III)}$$

The $CO_2$/CO ratio in the gas deriving from reaction III, which represents the level of primary post-combustion, depends on the balance between gas, carbon and oxidized and reduced iron at the interface of molten metal with slag.

When secondary oxygen is blown into the converter through the higher lances 7, secondary post-combustion of gas from reaction I, II and III takes place and supplies energy for iron-ore reduction and for keeping the temperature of molten products to suitable values.

Material injections into the converter are made from their converter's side walls into the slag that floats on the molten bath.

Injecting lances are directed radially and arranged on two levels. Those on the first, lower level 6 are equipped with coaxial concentric nozzles. Fine coal and fluxes are injected through the inner nozzle, primary oxygen through the outer nozzle. Lances on the second level 7 inject oxygen.

This arrangement ensures that oxygen is blown in the converter and into the slag floating on the molten bath, thus preventing any interaction between the oxygen stream and the metal bath.

The lances are inclined downwards by an angle in the range of 0° to 40° from the horizontal plane.

The parameter describing the degree of gas combustion is the post-combustion ratio (PCR) defined as:

$$PCR=(CO_2+H_2O)/(CO+CO_2+H_2+H_2O).$$

Preferably the PCR in the reactor's bottom area ranges from 20 to 60%, while the PCR in the reactor's top area ranges from 70 to 95%.

Energy in the form of heat, produced by gas combustion, is transferred with a certain efficiency to the liquid phases, i.e. molten slag and cast iron.

The efficiency of heat transfer from gas to the slag and cast iron bath is measured by the parameter Heat Transfer Efficiency (HTE), defined as:

$$HTE=[1-(H(T_g)(-H(T_b))/DH_{pc}]$$

where:
  $H(T_g)$ is the gas enthalpy after post-combustion, as calculated at the temperature of gas
  $H(T_b)$ is the gas enthalpy after post-combustion as calculated at the bath temperature
  $DH_{pc}$ is the variation in the enthalpy of post-combustion calculated at the bath temperature, decreased by the heat losses to the outside.

Preferably the HTE in the reactor's bottom area, ranges form 70 to 90%.

Those fractions of iron ore and coal that do not react generate the slag that floats on molten cast iron.

Slag quantity, which affects the reduction kinetics, and slag quality, which affects both cast iron composition and chemical attack of refractories, are controlled by feeding specific fluxes, such as CaO and MgO, to the converter.

Fluxes added as deslagging agents have the following main purposes:

they improve the quality of cast iron by fixing sulphur that derives from coal gasification;

they decrease the chemical attack of slag onto the converter's refractory walls.

A stirring gas, typically nitrogen, is blown from the converter's bottom through porous plugs.

According to another embodiment of the present invention, the top chamber of the reactor is cooled along its height in a differentiated manner by means of cooling circuits and/or by using suitable refractory materials.

The following examples will provide a more detailed description of some embodiments of the present invention, in order to illustrate its purposes, characteristics, benefits and operation. However said examples are in no way limiting the extent of the invention.

EXAMPLE 1

Embodiment of the Apparatus According to the Invention as Shown in FIG. 1.

The main features of the embodiment of the apparatus according to the invention, used in this example, are reported in the following table 1.

TABLE 1

| Dresser | |
|---|---|
| D: inner diameter | 1.2 m |
| H: height (including truncated-cone connection) | 5 m |
| Converter | |
| D: inner diameter | 2 m |
| H: height | 5.8 m |
| H/D ratio of total useful height (H) and inner useful diameter of the cylindrical portion of the dresser (D) | 4.16 |
| H/D ratio of total useful height (H) and inner useful diameter of the cylindrical portion of converter (D) | 2.9 |
| d/D ratio of inner diameter of dresser and inner diameter of converter | 0.6 |
| h/H ratio of height of dresser and height of converter | 0.8 |
| Truncated-cone connection | |
| Height | 2.3 m |
| Aperture angle of the connection between converter and dresser | 78° |
| Ratio of truncated-cone connection and height of converter | 0.4 |

The specific features of the embodiment of the process according to the invention, used in the present example are reported in the following table 2.

TABLE 2

| | |
|---|---|
| Gas post-combustion degree: outlet of dresser (PCR3) | 80% |
| Gas post-combustion degree: outlet of converter (PCR2) | 40% |
| Pressure | 3 bar |
| Heat Transfer Efficiency of gas to solid metal in the course of pre-reducing and pre-heating (HTE of dresser[1]) | 80% |
| Heat Transfer Efficiency of gas to molten bath (HTE of converter) | 80% |

TABLE 2-continued

| | |
|---|---|
| Gas temperature: outlet of dresser (water-cooled) | 1700–2000° C. |
| Gas temperature: outlet of converter | 1500–1700° C. |

In Table 3 the solid injected materials and their flow-rates (kg/h for solid materials, Nm3/h for gas) per ton of cast iron are reported.

TABLE 3

| Dresser | |
|---|---|
| Iron ore | 1512 kg/t cast iron quality: fine iron ore with large iron content |
| tertiary oxygen blown in the dresser | 200 Nm$^3$/t cast iron |
| Converter | |
| Fine coal | 710 kg/t cast iron average grain: 70 micron |
| velocity of coal carrier gas | v = 100 m/s |
| primary oxygen (bottom tuyeres) | 170 Nm$^3$/t cast iron v = 250 m/s |
| secondary oxygen (top lances) | 290 Nm$^3$/t cast iron v = 250 m/s |
| fluxes | 100 kg/t cast iron grain: 1 micron |

Table 4 reports the materials produced by the apparatus:

TABLE 4

| Dresser | |
|---|---|
| process gas | 1500 Nm$^3$/t cast iron |
| Converter | |
| cast iron | 1000 Kg |
| slag | 250 kg |

In Table 5 the quantities are reported for a correct execution of the process, in terms of chemical reactions and heat transfer.

TABLE 5

| | |
|---|---|
| Stirring power for the molten bath | 1.5 kW/t of cast iron in the molten bath |
| Ratio between cast iron mass and slag mass in the converter | 2 |

EXAMPLE 2

Embodiment of the Apparatus According to the Invention as Shown in FIG. 2

The apparatus of FIG. 2 differs from the one in FIG. 1 only because the discharge conduit 4 is shaped as two truncated cones 9 and 10, separated by a cylinder 11 whose bases coincide with the larger bases of truncated cones 9 and 10 respectively.

When the process under example 1 is carried out in this apparatus, it results in a better control of carry-over that improves to 3%. This value in example 1 is of 4%.

What is claimed is:

1. Process for direct production of cast iron from fine iron ore and fine coal in an apparatus comprising one reactor provided with two areas in open communication—one top area (1), provided with one or more nozzles for introducing a gas and an iron ore, and one bottom area (2), delimited by at least a bottom and side walls and containing a molten iron bath and a molten slag layer floating on said molten iron bath—where the process is carried out, such process being characterized by encompassing the operations of:

introducing together iron ore and a gas containing or consisting of oxygen, into the top area (1) of the reactor through the same nozzle(s);

introducing fine coal, oxygen, fine fluxes and a carrier gas into the bottom area (2) of the reactor through its side walls and into said slag, either horizontally or downwardly, said fine coal, fine fluxes, a carrier gas and one portion of oxygen being introduced into the reactor at a level which is lower than the level at which the remaining portion of oxygen is introduced into the reactor and supplying a stirring gas into the bottom of said bottom area (2).

2. Process according to claim 1, wherein the said top area (1) has a substantially rotationally symmetrical shape and is provided with a plurality of nozzles (5) that are uniformly spaced and arranged on two levels and iron ore is injected together with a gas containing or consisting of oxygen into said top area (1), in a radial direction, through said nozzles.

3. Process according to claims 1 or 2, wherein the introduction of coal, fluxes and a carrier gas is made together and simultaneously with the introduction of one portion of oxygen into the bottom area (2) of the reactor into the said slag from the lower level.

4. Process according to claim 1, wherein iron ore has a grain size smaller than 8 mm.

5. Process according to any one of claims 1 or 4, wherein the grain size of fine coal and fine fluxes is smaller than 3 mm.

6. Process according to any one of claims 1 or 4, wherein the content of iron in the iron ore is lower than 50%.

7. Process according to any one of claims 1 or 4, wherein the velocity of iron ore and oxygen introduction into the reactor's top area (1) is lower than 40 m/s and the iron ore is pre-heated at least up to 800° C. and pre-reduced at least into $Fe_3O_4$ in less than 1 s.

8. Process according to any one of claims 1 or 4, wherein the coal-to-flux ratio ranges from 3 to 15.

9. Process according to any one of claims 1 or 4, wherein the binary basicity index of slag ranges from 1.1 to 1.3.

10. Process according to any one of claims 1 or 4, wherein the Post-Combustion Ratio (PCR) in the reactor's top area ranges from 70 to 95%.

11. Process according to claims 1 or 4 in which the Post-Combustion Ratio (PCR) in the reactor's bottom area ranges from 20 to 60%.

12. Process according to claims 1 or 4, wherein the Heat Transfer Efficiency (HTE) in the reactor's bottom area between the gas and the iron and slag bath ranges from 70 to 90%.

13. Process according to claims 1 or 4, wherein HTE in the reactor's bottom area ranges from 70 to 90% independently from the PCR value.

14. Process according to claims 1 or 4, wherein the formation of an emulsion between the slag and the molten iron in the reactor's bottom area is also obtained by blowing a stirring gas from the bottom of said bottom area, the stirring gas power being lower than 2.5 kW per ton of molten bath.

15. Process according to claim 14, wherein the inner pressure of the reactor ranges from 1 to 4 bar in order to keep the average axial velocity of the gas in the reactor's top area below 5 m/s and to keep the carry-over below 5%.

* * * * *